3,365,445
1β,2β-METHYLENE STEROIDS OF THE ANDROSTANE SERIES
Rudolf Wiechert, Hans Mueller, and Otto Engelfried, Berlin, Germany, assignors to Schering Aktiengesellschaft, Berlin, Germany
No Drawing. Filed Mar. 16, 1965, Ser. No. 440,307
Claims priority, application Germany, Mar. 26, 1964, Sch 34,870
18 Claims. (Cl. 260—239.55)

ABSTRACT OF THE DISCLOSURE

Novel compounds having the formula

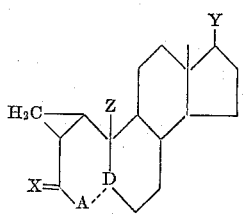

wherein X is a member selected from the group consisting of

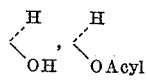

and oxygen and wherein Y is a member selected from the group consisting of oxygen,

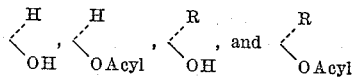

R in the last two formulas being a member selected from the group consisting of lower alkyl, alkenyl and alkinyl, and wherein Z is a member selected from the group consisting of hydrogen and methyl and wherein

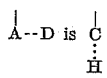

with the proviso that in the event X is O,

is a member selected from the group consisting of

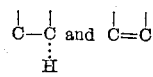

---

Generally when active methylene is added to steroids such as by reaction with dimethyl sulfonium methylide or dimethyl sulfoxonium methylide, 1,2α-methylene steroids are obtained. It was therefore entirely unexpected that it would be possible to attach methylene to steroids in the 1,2β position.

The present application therefore has the broad object to obtain 1,2β-methylene substituted steroids of the general composition indicated.

Another object of the present invention is to improve the pharmacological properties of methylene-free steroids which nevertheless are otherwise structurally analogous to the steroids used as starting products.

A more specific object of the invention is to broaden the spectrum of activity of the androstane type steroids.

Still under another aspect the invention has the objective to form novel steroids which have anabolic, androgenic, progestational effects as well as are useful as inhibitors of ovulation and hypophysis activity.

These and other objects as will appear from the following description of the invention are accomplished by the novel 1,2β-methylene substituted compounds of the formula set out in the first paragraph of this specification.

A process for making these novel compounds starts from Δ¹-3β-hydroxy steroids of the general formula

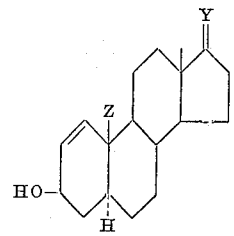

wherein Y is a member selected from the group consisting of oxygen,

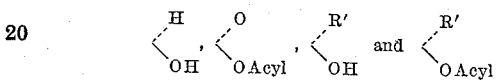

R' being a lower alkyl or alkinyl and wherein Z has the meaning above defined. These compounds are subjected to the action of methylene iodide in the presence of copper-plated zinc powder while they are dissolved in a suitable organic solvent, preferably in boiling absolute ether. The thus obtained novel 1,2β-methylene compositions can then be processed further to obtain desired substituted products. For instance, if there is a hydroxy group in the 3 position of the primary 1,2β-methylene steroids this can be oxidized to the 3-keto group. Furthermore, the 3 hydroxy or other hydroxy groups can be esterified by reaction with a desired acid or suitable acid derivative. It is also possible to saponify the ester groups present in the molecule and to subject the thus exposed hydroxyl groups to a reesterification to introduce a different ester group into the molecule. Another suitable process for modifying the primary reaction products is the oxidation of a 17β-hydroxyl group to a 17 keto group. During this reaction a blocking group may be introduced into a keto group which may be present on the molecule in the 3-position by means of ketalization, as is well known, to prevent the keto group from partaking in the reaction. Once a keto group has been introduced into the 17 position a lower alkyl or alkinyl group may be then introduced into this position, for instance, by means of a Grignard reaction. If a 17α-alkinyl group has been placed on the molecule in this or any other manner this group then lends itself to hydrogenation to form an alkenyl or alkyl group.

It is furthermore posible to convert the primary or modified products of the reaction which are 1,2β-methylene substituted by introducing an additional Δ⁴ double bond. This presupposes that X in the first noted formula is oxygen. This reaction can, for instance, be carried out with selenium dioxide or 2,3-dichloro-5,6-dicyanobenzoquinone.

The reference to alkyl, alkenyl, alkinyl and acyl groups in this discussion is to be understood to refer to the customary residues present and employed in the steroid mixture. The first listed three residues are preferably methyl or ethyl or vinyl or ethinyl or propinyl. Among the acyl groups the preferred residues are those of the following acids: saturated and unsaturated, aliphatic and aromatic, straight chain and branched, unsubstituted and substituted, mono- and dicarboxylic acids such as acetic acid, propioric acid, butric acid, valeric acid, caproic acid, enanthic acid, undecylic acid, cyclopentyl propionic acid, oleic acid, lactic acid, succinic acid, benzoic acid, mono- and dichloroacetic acid and furthermore in this connection the customary inorganic acids such as sulfuric and phosphoric acid.

It may be found advantageous to introduce the substituent R into the 17 position of the molecule after the methylene group has been attached to the nucleus. This can be done by starting from compounds that have a keto group in the 17-position whereupon a 17α attached alkyl or alkinyl group is introduced into the molecule by means of a Grignard reaction and the alkinyl group which is thus formed or may be formed in a similar manner may then be subjected to hydrogenation. Since the hydrogenation of the alkinyl group can be interrupted when reaching the alkenyl group it is by means of this process possible to form also alkenyl substituted compounds which cannot be obtained by reaction of $\Delta^1$-17-alkenyl compositions with active methylene.

For the purpose of the Grignard reaction it is advisable to select such 1,2β-methylene 17-ketosteroids wherein the substituent X in the 3-position cannot enter into an undesirable reaction with the Grignard reagent. Thus these compounds may be 3β hydroxy or 3β acyloxy compounds which are oxidized to the corresponding 3 ketones only after the Grignard reaction has been completed. However, it is also possible to alkylate the 17-position of a molecule which is substituted by a ketone in the 3-position provided that a blocking group is present in the 3 ketoposition during the Grignard reaction. This can be accomplished, for instance, by preceding ketalization. This is particularly advantageous in the case of the 1,2β-methylene-17β-hydroxy-3-keto-steroids. The 17β-hydroxy-group is converted in this case to the 17-ketogroup only after a ketal blocking group has been substituted for the 3-ketogroup.

The above-mentioned introduction of a $\Delta^4$ double bond is preferably effected by heating the compound with selenium dioxide and acetic acid while in a suitable organic solvent, for instance, tert. butanol and preferably upon exclusion of air which latter can be accomplished, for instance, by a protective atmosphere such as nitrogen. It is possible also to use 2,3-dichloro-5,6-dicyanobenzoquinone instead of selenium dioxide.

The following examples will illustrate the invention:

*Example 1*

(a) 6.7 g. $\Delta^1$-5α-androstene-3β,17β-diol-17-acetate (J. Med. Chem. 6 (1963), 161) in 150 ml. absolute ether and 16.7 ml. of glycol dimethyl ether were heated with 12.12 g. zinc (copper) (J. Org. Chem. 24 (1959), 1825) and 9.84 ml. methylene iodine for 15 hours to 40° C. After cooling the zinc (copper) was removed by suction and the compound was then washed with ether. The filtrate was thereupon washed three times with a saturated ammonium chloride solution and was subsequently washed also with water up to neutral reaction, and was dried over sodium sulfate. The solution was then distilled in vacuo up to dryness. The residue was triturated with pentane and was recrystallized from diisopropyl ether. One obtained 3.7 g. of 1,2β-methylene-5α-androstane-3β,17β-diol-17-acetate having a melting point between 174–175° C.

Near IR: 1.64 and 2.22μ (cyclopropane),
IR: 2.95μ (OH), 5.79μ (C=O-acetate), 7.99/8, 04/9, 60/9.71μ (acetate).
UV: inactive (b) 82 ml. methylene iodide and 101 g. zinc (copper) were added to a boiling solution of 33.5 g. of $\Delta^1$-5α-androstene-3β,17β-diol-17-acetate in 10 fractions at intervals of 2 hours. After cooling the zinc (copper) was removed by suction and the compound washed with ether. The filtrate was washed three times with saturated ammonium chloride solution and thereafter washed with water up to neutral reaction. It was then dried over sodium sulfate and concentrated by evaporation in vacuo up to dryness.

The crystalline residue was subjected to chromatography over a silica gel with hexane/ethyl acetate (in the ratio of 9:1). By elution then were obtained first 26 g. of $\Delta^1$-5α-androstene-3β,17β-diol-17-acetate, then 4.04 of a mixture of this compound and 1,2β-methylene-5α-androstene-3β,17β-diol-17-acetate and finally 720 mg. of this last compound which after recrystallization from isopropyl ether had a melting point of 174.5–175° C.

*Example 2*

300 mg. of the 1,2β-methylene-5α-androstane-3β,17β-diol-17-acetate obtained as in Example 1 were left on the shelf overnight at room temperature with 0.6 ml. acetic acid anhydride and 1.2 ml. absolute pyridine. The reaction mixture was introduced into an iced sodium chloride solution. The precipitate was extracted with methylene chloride. After neutral washing, drying and concentration by evaporation of the methylene chloride phase there was left 1,2β-methylene 5α-androstane-3β,17β-diol-3-17-diacetate.

*Example 3*

27 g. of $\Delta^1$-5α-androstene-3β,17β-diol-17-propionate (German Patent 1,079,040) were reacted and processed as in Example 1. After chromatography there were obtained 730 mg. of 1,2β-methylene-5α-androstane-3β,17β-diol-17-propionate.

*Example 4*

42.5 g. of $\Delta^1$-5α-androstene-3β,17β-diol-17-enanthate (German Patent 1,079,040) were reacted and processed as in Example 1. As the solvent there was used in this case a mixture of 9 parts diethyl ether and 1 part glycol dimethyl ether. After chromatography there were obtained 1.94 g. of 1,2β-methylene-5α-androstane-3β,17β-diol-17-enanthate.

*Example 5*

30 g. of 17α-methyl-$\Delta^1$-5α-androstene 3β,17β-diol (German Patent 1,079,040) were reacted and processed as in Example 1. As the solvent there were used a mixture of 9 parts diethyl ether and 1 part of glycol dimethyl ether. After chromatography one obtained 650 mg. of 1,2β-methylene-17α-methyl-5α-androstane 3β,17β-diol having a melting point between 203–206° C.

*Example 6*

27 g. of 17α-ethyl-$\Delta^1$-5α-androstene-3β,17β-diol (German Patent 1,079,040) were reacted and processed as in Example 1. As the solvent there was used a mixture of 9 parts diethyl ether and 1 part glycol dimethyl ether. After chromatography there were obtained 705 mg. 1,2β-methylene-17α-ethyl-5α-androstane-3β,17β-diol.

*Example 7*

30.5 g. 17α-ethinyl-$\Delta^1$-5α-androstene-3β,17β-diol (German Patent 1,079,040) were reacted and processed as in Example 1. After chromatography there were obtained 715 mg. of 1,2β-methylene-17α-ethinyl-5α-androstane-3β,17β-diol having a melting point between 194–195° C. (diisopropyl ether).

*Example 8*

18 g. 19-nor-$\Delta^1$-5α-androstene-3β,17β-diol-17-propionate (German Patent 1,079,040) were reacted and processed as in Example 1. There were obtained after chromatography 3.97 g. of 1,2β-methylene-19-nor-5α-androstane-3β,17β-diol-17-propionate.

*Example 9*

300 mg. of the product obtained in Example 8 were acetylated as in Example 2. There were obtained 232 mg. of 1,2β - methylene - 19 - nor - 5α - androstane - 3β,17β-diol-3-acetate-17-propionate.

*Example 10*

25 g. of 17α-ethinyl-19-nor-$\Delta^1$-5α-androstane-3β,17β-diol (German Patent 1,079,040) were reacted and processed as in Example 1. After chromatography there were obtained 4.05 g. of 1,2β-methylene-17α-ethinyl-19-nor-5α-androstane-3β,17β-diol.

*Example 11*

80.5 ml. methylene iodide and 98.1 g. zinc (copper) (J. Org. Chem. 24 (1959), 1825), were added to a boiling solution of 28.8 g. Δ$^1$-5α-androstene-3β-ol-17-one in 675 ml. absolute ether and 75 ml. glycol dimethyl ether in 10 fractions at intervals of 2 hours. After cooling the zinc (copper) was removed by suction and subsequently washed with ether. The filtrate was washed three times with saturated ammonium chloride solution and several times with water. After drying and distillation of the ether solution the residue was subjected to chromatography over silica gel using 9 parts of hexane and 1 part of acetic acid ester. There were obtained 2.3 g. of 1,2β-methlyene-5α-androstane-3β-ol-17-one having a melting point between 180.5–181.5° C. (diisopropyl ether).

Near-IR: 1.64 and 2.22μ (1.2β-methylene).

The starting product in this reaction has not been described so far in the literature. It has a melting point between 169–171° C. upon recrystallization from diisopropyl ether/methylene chloride. The product can be obtained as follows: Δ$^1$-5α-androstene-3β,17β-diol-17-acetate (J. Med. Chem. 6 (1963), 161) is in the first place reacted with dihydropyrane in order to etherify the hydroxyl group of the 3-position. The 17-position acetoxy group of the thus formed tetrahydropyranyl ether is then saponified with potassium carbonate and water in methanol whereupon the thus exposed 17β-hydroxyl group is oxidized to the keto group with chromic acid in pyridine and finally this is followed by acid splitting of the tetrahydropyranyl ether group.

*Example 12*

5 g. of 19-nor-Δ$^1$-5α-androstene-3β,17β-diol-17-acetate (German Patent 1,079,040) were reacted and processed as in Example 1. After chromatography and trituration with pentane there were obtained 2.2 g. of 1,2β-methylene-19-nor-5α-androstane-3β,17β-diol-17-acetate having a melting point of 162–163° C.

*Example 13*

2 g. of 17α-ethinyl-19-nor-Δ$^1$-5α-androstene-3β,17β-diol-17-acetate (German Patent 1,079,040) were reacted and processed as in Example 1. One obtains after recrystallization from diisopropyl ether 1,2β-methylene-17α-ethinyl-19-nor-5α-androstane-3β,17β-diol-17-acetate having a melting point between 162–165° C.

*Example 14*

1.8 g. of the product of Example 5, that is, 1,2β-methylene-17α-methyl-5α-androstane-3β,17β-diol were acetylated as in Example 2. After chromatography and recrystallization from pentane there were obtained 0.9 g. 1,2β-methylene-17α-methyl-5α-androstane-3β,17β-diol-3-acetate having a melting point between 122–122.5° C.

*Example 15*

(a) 550 mg. of the product of Example 1, that is, 1,2β-methylene-5α-androstane-3β,17β-diol-17-acetate were dissolved in 21.5 ml. acetone and reacted upon stirring with 119 mg. chromium (VI) oxide in 0.45 ml. of 8 N sulfuric acid. Stirring was continued for 5 minutes, the excess oxidizing agent was destroyed with some methanol and the reaction solution then poured into an iced sodium chloride solution. The precipitate was removed by filtration, washed with water until neutral and while still wet was taken up in methylene chloride. The methylene chloride phase was then subjected to concentration by evaporation. The residue was 1,2β-methylene-5α-androstane-17β-ol-3-one-17-acetate which after recrystallization from diisopropyl ether had a melting point between 211–212° C. The yield is 460 mg.

(b) 500 mg. of chromium (VI) oxide was slowly dissolved upon stirring in 5 ml. of pyridine. To this was added dropwise a solution of 500 mg. of the product of Example 1, that is, 1,2β-methylene-5α-androstane-3β,17β-diol-17-acetate in 15 ml. pyridine followered by stirring for another 7 hours at room temperature. The reaction solution was subjected to vacuum distillation at 40° C. The residue was extracted with methylene chloride, the methylene chloride phase was washed until neutral, dried and concentrated by evaporation. There remains a residue of 1,2β-methylene-5α-androstane-17β-ol-3-one-17-acetate which after recrystallization from isopropyl ether had a melting point of 212–212.5° C. The yield was 395 mg.

Near-IR: 1.63 and 2.21μ (cyclopropane)
IR: 5.79μ (C=O-acetate), 5.92μ (3-C=O-1,2-cyclopropane) 7.90/7.99/9.56/9.72μ (acetate)
UV: $\epsilon_{207}$=3600; $\epsilon_{275}$=40.9 (methanol).

(c) From a solution of the product of Example 1, that is, 1,2β-methylene-5α-androstane-3β,17β-diol-17-acetate and 10.5 ml. cyclohexanone in 48 ml. absolute toluene the water was removed by azeotropic distillation. To this were added within a period of 15 minutes 0.55 g. of aluminum isopropylate dissolved in 5.5 ml. absolute toluene followed by distillation for an hour. After cooling down the reaction solution was diluted with benzene and then washed with diluted sulfuric acid, aqueous sodium bicarbonate solution and water and subsequently steam distilled. The precipitate that formed in the aqueous phase was extracted with ether.

After washing, drying and distilling of the ether extract and recrystallization of the residue from diisopropyl ether there were obtained 720 mg. 1,2β-methylene-5α-androstane-17β-ol-3-one-17-acetate, melting point 214–215° C.

*Example 16*

500 mg. of the product obtained in Example 15 in 10 ml. methanol were refluxed with 0.86 g. potassium carbonate in 1.75 ml. water for 90 minutes under a nitrogen atmosphere. Subsequently, 0.7 ml. glacial acetic acid were added. The reaction mixture was cooled and diluted with water. The residue was filtered off, washed neutral and dried. The white precipitate consisted of 1,2β-methylene-5α-androstane-17β-ol-3-one which after recrystallization from diisopropyl ether had a melting point of 195–195.5° C.

UV: $\epsilon_{208}$=3400; $\epsilon_{275}$=43.4 (methanol).

*Example 17*

550 mg. of the product of Example 3, that is, 1,2β-methylene-5α-androstane-3β,17β-diol-17-propionate were oxidized in the manner of Example 15. There were obtained 450 mg. 1,2β-methylene-5α-androstane-17β-ol-3-one-17-propionate having a melting point of 160.5–161.5° C. (diisopropyl ether).

Near-IR: 1.63 and 2.21μ (cyclopropane)
IR: 5.92μ (3-C=O-1,2-cyclopropane)
UV: $\epsilon_{207}$=3400; $\epsilon_{275}$=46.6 (methanol).

*Example 18*

550 mg. of the product of Example 4, that is, 1,2β-methylene-5α-androstane-3β,17β-diol-17-enanthate were oxidized as in Example 15. There were obtained 445 mg. 1,2β-methylene-5α-androstane-17β-ol-3-one-17-enanthate.

Near-IR: 1.63 and 2.21μ (cyclopropane)
IR: 5.92μ (3-C=O-1,2-cyclopropane)
UV: $\epsilon_{207}$=3100; $\epsilon_{275}$=44.0 (methanol).

*Example 19*

550 mg. of the product of the reaction of Example 5, that is, 1,2β-methylene-17α-methyl-5α-androstane-3β,17β-diol were oxidized as in Example 15. There were obtained 485 mg. of 1,2β-methylene-17α-methyl-5α-androstane- 17β-ol-3-one having a melting point of 200–201° C. (diisopropyl ether).

Near-IR: 1.63 and 2.21μ (cyclopropane)
IR: 5.92μ (3-C=O-1,2-cyclopropane).
UV: $\epsilon_{208}=3980$; $\epsilon_{275}=42.5$ (methanol).

*Example 20*

400 mg. of the product of the previous example (Example 19) were heated with 2 ml. acetic acid anhydride and 2 ml. of absolute pyridine for 3 hours to 130–140° C. The reaction mixture was precipitated in ice water and the precipitate extracted with methylene chloride. After washing to neutrality, drying and concentration by evaporation of the charcoal treated methylene chloride phase there were obtained 1,2β-methylene-17α-methyl-5α-androstane-17β-ol-3-one-17-acetate.

*Example 21*

550 mg. of the product of Example 6, that is, 1,2β-methylene - 17α-ethyl-5α-androstane - 3β,17β-diol were oxidized as in Example 15. There were obtained 450 mg. of 1,2β-methylene-17α-ethyl-5α-androstane - 17β-ol-3-one; melting point 182.5–183° C. (diisopropyl ether).
Near-IR: 1.63 and 2.21μ (cyclopropane)
IR: 5.92μ (3-C=O-1,2-cyclopropane)
UV: $\epsilon_{207}=3270$; $\epsilon_{275}=42.2$ (methanol).

*Example 22*

500 mg. of the product of Example 7, that is, 1,2β-methylene - 17α-ethinyl-5-α-androstane-3β,17β-diol were oxidized as in Example 15. There were obtained 465 mg. of 1,2β-methylene-17α-ethinyl-5α-androstane - 17β-ol-3-one; melting point 189.5–190.5° C. (diisopropyl ether).
UV: $\epsilon_{205}=3610$; $\epsilon_{274}=48.8$ (methanol).

*Example 23*

1.1 g. of the product of Example 8, that is, 1,2β-methylene - 19 - nor - 5α-androstane - 3β,17β-diol-17-propionate were oxidized as in Example 15. There were obtained 924 mg. 1,2β-methylene-19-nor-5α-androstane-17β-ol-3-one-17-propionate.

*Example 24*

1.0 g. of the product of Example 23, that is, 1,2β-methylene - 19 - nor - 5α-androstane-17β-ol-3-one-17-propionate were saponified as in Example 16. There were obtained 0.68 g. of 1,2β-methylene-19-nor-5α-androstane-17β-ol-3-one; melting point 190–190.5° C. (diisopropyl ether).
UV: $\epsilon_{206}=3800$; $\epsilon_{277}=45.3$ (methanol).

*Example 25*

660 mg. of the product of Example 24, that is, 1,2β-methylene - 19-nor - 5α - androstante-17β-ol-one, were acetylated as in Example 2. There were obtained 463 mg. of 1,2β-methylene-19-nor-5α-androstane-17β-ol-3-one-17-acetate, melting point 183.5–184° C. (diisopropyl ether).
UV: $\epsilon_{208}=2810$; $\epsilon_{275}=48.8$ (methanol).

*Example 26*

1.1 g. of the product of Example 10, that is, 1,2β-methylene - 17α - ethinyl - 19-nor-5α-androstane-3β, 17β-diol were oxidized as in Example 15. There were obtained 890 mg. 1,2β-methylene - 17α-ethinyl-19-nor-5α-androstane-17β-ol-3-one.

*Example 27*

400 mg. of the just described product of Example 26 were reacted and processed with 2 ml. acetic acid anhyride and 2 ml. absolute pyridine as in Example 20. There were obtained 284 mg. of 1,2β-methylene-17α-ethinyl - 19 - nor-5α-androstane-17β-ol-3-one-17-acetate.

*Example 28*

1.5 g. of the product of Example 13, that is, 1,2β-methylene - 17α - ethinyl - 19-nor-5α-androstane-3β,17β-diol-17-acetate were oxidized as in Example 15. After chromatography and recrystallization from diisopropyl ether there were obtained 500 mg. of 1,2β-methylene-17α - ethinyl - 19- nor - 5α-androstane-17β-ol-3-one-17-acetate, melting point 164–165° C.
UV: $\epsilon_{205}=4420$; $\epsilon_{277}=47.2$ (methanol).

*Example 29*

500 mg. of the product of Example 16, that is, 1,2β-methylene-5α-androstane-17β-ol-3-one in 23 ml. pyridine (absolute) were reacted upon cooling by ice with 0.38 ml. dichloroacetylchloride and were kept for 40 hours at −6° C. After chromatography and recrystallization from diisopropyl ether there were obtained 200 mg. 1,2β-methylene - 5α - androstane - 17β-ol-3-one-17-dichloroacetate; melting point 219–220° C.
UV: $\epsilon_{208}=3400$; $\epsilon_{272}=68.1$ (methanol).

*Example 30*

400 mg. of the product of Example 22, that is, 1,2β-methylene - 17α-ethinyl-5α-androstane-17β-ol-3-one were acetylated as in Example 20. After chromatography and recrystallization there were obtained 325 mg. of 1,2β-methylene - 17α - ethinyl - 5α-androstane-17β-ol-3-one-17-acetate; melting point 182–183.5° C. (pentane).

*Example 31*

2.3 g. of 1,2β-methylene-5α-androstane-3β-ol-17-one (made as described in Example 11) in 70 ml. of absolute benzene were added by dropper to a cooled Grignard solution which latter was prepared from 2.24 g. magnesium files in 25 ml. absolute ether and 5.8 ml. methyl iodide dissolved in 16.2 ml. of absolute ether. The product was stirred for 4 hours at room temperature in a nitrogen atmosphere. Concentrated aqueous ammonium chloride solution was then cautiously added upon external cooling by ice. The reaction mixture was thereupon slightly acidified with dilute hydrochloric acid and extracted with ether. After neutral washing, drying and concentration by evaporation of the ether solution the precipitate was recrystallized from diisopropyl ether. There were obtained 1.65 g. of 1,2β-methylene-17α-methyl-5α-androstane-3β,17β-diol; melting point 205–207° C.

*Example 32*

800 mg. of 1,2β-methylene-5α-androstane-17β-ol-3-one as formed in Example 16, were refluxed in 40 ml. benzene with 2 ml. freshly distilled ethylene glycol and 20 mg. p-toluene sulfuric acid for 6 hours upon stirring and in a nitrogen atmosphere. The formed water was continuously removed. After cooling the benzene phase was separated and washed until neutral. The ethylene glycol phase was reacted with a sodium bicarbonate solution and extracted with benzene. The benzene extract was washed until neutral and added to the previously separated benzene phase. After drying and distillation of the benzene solution recrystallization was effected of the residue from acetic acid ester. There were obtained 725 mg. of 1,2β-methylene - 5α - androstane - 17β - ol-3-one-3-ethyleneketal; melting point 177–178° C. (diisopropyl ether/acetone).

*Example 33*

725 mg. of the just described product of Example 32 were oxidized in the manner of Example 15. There were obtained 705 g. of 1,2β-methylene-5α-androstane-3,17-dione-3-ethylene-ketal; melting point 214.5–215.5° C. (triturated with pentane).

*Example 34*

705 mg. of the product obtained in Example 33 in 35 ml. absolute benzene were added by dropper to a Grignard solution which latter was made from 885 mg. magnesium filings in 10 ml. absolute ether and 2.28 ml. methyl iodide in 6.2 ml. absolute ether. The product of the reaction is stirred for 4 hours at room temperature in a nitrogen atmosphere. To this product was cautiously added concentrated aqueous ammonium chloride solution upon external cooling by ice. The product was slightly acidified with dilute hydrochloric acid and extracted with ether. After neutral washing, drying and concentration by evaporation of the ether solution recrystallization was effected of the precipitate from diisopropyl ether. There were thus obtained 1,2β-methylene-17α-methyl-5α-androstane-17β-ol-3-one-3-ethyleneketal.

Example 35

495 mg. of the just described reaction product of Example 34 were subjected to ketal splitting by reacting a solution thereof in 70 ml. methanol with 7 ml. 8% (volume/volume) of sulfuric acid, the reaction being carried out by refluxing for 35 minutes. The reaction solution was then concentrated to one-fourth of its initial volume, diluted with ice water, caustiously neutralized with a sodium carbonate solution and extracted with methylene chloride. After neutral washing, drying and evaporating off the methylene chloride the residue was recrystallized from diisopropyl ether. There were thus obtained 380 mg. of 1,2β-methylene-17α-methyl-5α-androstane-17β-ol-3-one; melting point 199.5–200.5° C. (diisopropyl ether).

UV: $\epsilon_{208}=3700$; $\epsilon_{275}=37.2$ (methanol).

Example 36

A cooled Grignard reagent made from 6.08 g. magnesium filings in 75 ml. absolute tetrahydrofurance and 19 ml. ethylbromide in 75 ml. absolute tetrahydrofurane were added to 90 ml. absolute tetrahydrofurane through which acetylene had been passed for 20 minutes. A rise in temperature occurred to 45° C. More acetylene was then added until the temperature went down again. Thereupon 3.1 g. of the product of Example 33, that is, 1,2β-methylene-5-α-androstane-3,17-dione-3 - ethyleneketal in 75 ml. absolute tetrahydrofurane were added by dropping. During the dropping procedure further acetylene was introduced. The reaction mixture was heated under a nitrogen atomsphere and upon stirring for 21 hours in an oil bath which had a tempeature of 70° C. Thereafter a concentrated aqueous ammonium chloride solution was added upon external cooling by ice. The product was then slightly acidified with dilute hydrogen chloride and extracted with ether. After neutral washing, drying and concentration by evaporation of the organic phase chromatography of the residue was effected over silica gel. Through elution with carbon tetrachloride/methylene chloride (in a ratio of 2:1) one obtained 1.6 g. of 1,2β-methylene-17α-ethinyl-5α - androstane - 17β - ol - 3 - one-3-ethyleneketal.

Example 37

1 g. of the just described product of Example 36 was subjected to ketal splitting as in Example 35. There were obtained 735 mg. 1,2β-methylene-17α-ethinyl-5α-androstane-17β-ol-3-one; melting point 189–190° C. (diisopropyl ether).

UV: $\epsilon_{206}=3600$; $\epsilon_{215}=49.0$ (methanol).

Example 38

370.5 mg. of the product of Example 36 above-described were hydrogenated in 30 ml. pyridine with 60 mg. of a 5% palladium/charcoal catalyst until they had taken up 1 mmol of hydrogen. This product was then filtered off from the catalyst and the filtrate concentrated in vacuum up to dryness. The residue was taken up in ether. The ether phase was washed with 2 N sulfuric acid, a sodium bicarbonate solution and water and is dried over sodium sulfate and subjected to distillation. There remained a residue of 265 mg. 1,2β-methylene-17α-vinyl-5α-androstane-17β-ol-3-one-3-ethyleneketal.

Example 39

265 mg. of the product just described of Example 38 were subjected to ketal splitting in the manner of Example 35. There were obtained 150 mg. of 1,2β-methylene-17α-vinyl-5α-androstane-17β-ol-3-one.

UV: $\epsilon_{207}=3450$; $\epsilon_{275}=39.5$ (methanol).

Example 40

250 mg. 1,2β-methylene-17α-ethinyl-5α-androstane-17β-ol-3-one formed as in Examples 22 or 37 were hydrogenated in 30 ml. pyridine with 60 mg. of a 5% Pd/C catalyst until the product has taken up 1 mmol of hydrogen. There were obtained 212 mg. of 1,2β-methylene-17α-vinyl-5α-androstane-17β-ol-3-one; melting point 171–172° C. (diisopropyl ether).

UV: $\epsilon_{207}=3720$; $\epsilon_{274}=44.7$ (methanol).

Example 41

The product of Example 11 and reacted as in Example 31, that is, 1,2β-methylene-5α-androstane-3β-ol-17-one could also be obtained in the following manner:

The 1,2β-methylene-5α-androstane-3β,17β-diol-17-acetate of Example 1 was subjected to etherification in the 3β-hydroxyl group. The 17-acetoxy group of the thus obtained tetrahydropyranyl ether was saponified with potassium carbonate and water in methanol. The thus exposed 17β-hydroxyl group was thereupon oxidized with chromic acid in pyridine forming a 17-ketogroup. Subsequently the tetrahydropyranyl ether group was subjected to acid splitting.

Example 42

The 3β-hydroxyl group of the product of Example 12, which is, 1,2β-methylene-19-nor-5α-androstane-3β,17β-diol-17-acetate was subjected to etherification with tetrahydropyrane. The 17-acetoxygroup of the thus obtained tetrahydropyranyl ether was then saponified with pontassium carbonate and water in methanol. This exposed was 17β-hydroxyl group which then was oxidized with chromic acid in pyridine to a 17 keto group whereupon the tetrahydropyranyl ether group was subjected to splitting by acid. There was thus obtained 1,2β-methylene-19-nor-5α-androstane-3β-ol-17-one having a melting point between 164–165° C. (diisopropyl ether/pentane).

Example 43

500 mg. of the product just described of Example 42 dissolved in 35 ml. absolute benzene were added by dropping to a cooled Grignard reagent. The reagent was formed from 1.67 g. magnesium filings in 15 ml. absolute ether and 5 ml. methyl iodide in 10 ml. absolute ether. The product was subjected to stirring for 4 hours at room temperature. After the conventional processing the residue was recrystallized from diisopropyl ether. There were obtained 370 mg. of 1,2β-methylene-17α-methyl-19-nor-5α-androstane-3β,17β-diol; melting point 200.5–201.5° C.

Example 44

From a solution of 500 mg. of the product of Example 43 and 8 ml. cyclohexanone in 38 ml. absolute toluene water was removed by azeotropic distillation. Thereupon 0.44 g. aluminum isopropylate in 4.4 ml. absolute toluene were added during a period of about 15 minutes and the distillation was continued for an hour.

The benzene diluted reaction product was washed after cooling with dilute sulfuric acid, an aqueous sodium bicarbonate solution and water and was subsequently steam-distilled. The precipitate obtained in the aqueous phase was extracted with ether.

After washing, drying and concentration by evaporation of the ether extract and recrystallization of the residue from diisopropyl ether there were obtained 380 mg. 1,2β - methylene - 17α - methyl - 19 - nor - 5α - androstane-17β-ol-3-one; melting point 182–183° C.

Example 45

(a) 1 g. of 1,2β-methylene-5α-androstane-17β-ol-3-one-17-acetate, obtained as in Example 15, 300 mg. selenium dioxide and 0.5 ml. glacial acetic acid were refluxed at 50 ml. tert. butyl alcohol for 24 hours in a nitrogen atmosphere upon stirring. After adding another 300 mg. selenium dioxide the product is heated again as above for 24 hours. The precipitated selenium was filtered off after cooling. The filtrate was thoroughly concentrated in vacuo. It was then diluted with ethyl acetate and the solution washed successively with sodium bicarbonate solution, dilute ammonium sulfide solution, dilute ammonia, water, diluted hydrochloric acid and again with water. After drying and concentration by evaporation of the acetic acid ester phase, the residue was subjected to chromatography with methylene chloride. There were thus obtained 435 mg. of 1,2β-methylene-$\Delta^4$-androstene-17β-ol-3-one-17-acetate; melting point 159.5–160° C.

(b) 1 g. of 1,2β-methylene-5α-androstane-17β-ol-3-one-17-acetate made as in Example 15 and 1 g. of 2,3-dichloro-5,6-dicyanobenzoquinone are refluxed for 10 hours in 30 ml. benzene. The benzene was then evaporated in vacuo. The residue was subjected to chromatography over silica gel with methylene chloride and methylene chloride/chloroform. There were thus obtained 405 mg. of 1,2β-methylene-$\Delta^4$-androstene-17β-ol-3-one-17-acetate; melting point 160–161° C.

Main infrared absorption bands:

5.81μ (C=O-acetate)
6.05μ (3-keto-$\Delta^4$-1,2-cyclopropane)
6.18μ (C=C-$\Delta^4$) 7.86/7.96μ (C=O-acetate)

(c) 500 mg. of 1,2β-methylene-5α-androstane-17β-ol-3-one-17-acetate were refluxed with 1 g. of 2,3-dichloro-5,6-dicyanobenzoquinone and 50 ml. abs. tert. butyl alcohol for 24 hours in a nitrogen atmosphere upon stirring. The solvent was removed in vacuo and the residue subjected to chromatography over silica gel with methylene chloride and methylene chloride/chloroform. There were thus obtained 312 mg. 1,2β-methylene-$\Delta^4$-androstene-17β-ol-3-one-17-acetate; melting point 159.5–160.5° C.

Example 46

485 mg. of 1,2β-methylene-17α-methyl-5α-androstane-17β-ol-3-one made as in Example 19 were dehydrogenated with selenium dioxide or with 2,3-dichloro-5,6-dicyanobenzoquinone as described in Example 45. There were obtained 225 mg. of 1,2β-methylene-17α-methyl-$\Delta^4$-androstene-17β-ol-3-one.

Main absorption bands of the infrared spectrum:

6.05μ (3-keto-$\Delta^4$-1,2-cyclopropane)
6.17μ (C=C-$\Delta^4$)

Example 47

465 mg. of 1,2β-methylene-17α-ethinyl-5α-androstane-17β-ol-3-one made as in Example 22 were dehydrogenated with selenium dioxide or 2,3-dichloro-5,6-dicyanobenzoquinone as described in Example 45. There were thus obtained 198 mg. of 1,2β-methylene-17α-ethinyl-$\Delta^4$-androstene-17β-ol-3-one; melting point 199.5–200.5° C. (ethyl acetate/hexane).

Example 48

600 mg. of 1,2β-methylene-19-nor-5α-androstane-17β-ol-3-one-17-acetate made as in Example 25 were dehydrogenated as in Example 45 with selenium dioxide or with 2,3-dichloro-5,6-dicyanobenzoquinone. There were obtained 205 mg. of 1,2β-methylene-19-nor-$\Delta^4$-androstene-17β-ol-3-one-17-acetate; melting point 151.5–152° C. (hexane).

Example 49

600 mg. of 1,2β-methylene-17α-ethinyl-19-nor-5α-androstane-17β-ol-3-one made as in Example 26 were dehydrogenated with selenium dioxide or with 2,3-dichloro-5,6-dicyanobenzoquinone as in Example 45. There were obtained 268 mg. of 1,2β-methylene-17α-ethinyl-19-nor-$\Delta^4$-androstene-17β-ol-3-one.

Example 50

1 g. of 1,2β-methylene-17α-ethinyl-19-nor-5α-androstane-17β-ol-3-one-17-acetate made as in Example 27 was dehydrogenated, as in Example 45, with selenium dioxide or with 2,3-dichloro-5,6-dicyanobenzoquinone. There were obtained 510 mg. 1,2β-methylene-17α-ethinyl-19-nor-$\Delta^4$-androstene-17β-ol-3-one-17-acetate.

UV: [$\epsilon_{219}$=8500]; $\epsilon_{242}$=11500 (methanol).

Example 51

500 mg. of 1,2β-methylene-17α-ethinyl-5α-androstane-17β-ol-3-one-17-acetate made as in Example 30 were dehydrogenated as in Example 45 with selenium dioxide or with 2,3-dichloro-5,6-dicyanobenzoquinone. There were obtained 190 mg. of 1,2β-methylene-17a-ethinyl-$\Delta^4$-androstene-17β-ol-3-one-17-acetate; melting point 204–204.5° C. (hexane). The same compound could also be obtained by acetylating the 17-ol compound of Example 47.

Example 52

500 mg. of 1,2β-methylene-17α-vinyl-5α-androstane-17β-ol-3-one made according to Example 39 or 40 was dehydrogenated in the same manner as in Example 45. There was thus obtained 1,2β-methylene-17α-vinyl-$\Delta^4$-androstene-17β-ol-3-one; melting point 168–169.5° C. (ethyl acetate). The same composition could also be obtained from the ethinyl compound of Example 47 by partial hydrogenation in absolute pyridine in the presence of palladium on charcoal.

Example 53

1 g. of 1,2β-methylene-17α-ethyl-5α-androstane-17β-ol-3-one made as in Example 21 was dehydrogenated in the manner of Example 45. There were obtained 1,2β-methylene-17α-ethyl-$\Delta^4$-androstene-17β-ol-3-one; melting point 186.5–187° C. (ethyl acetate). The same compound could also be obtained from the vinyl compound of Example 52 through partial hydrogenation in dioxane in the presence of palladium on charcoal.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 1,2β-methylene-17α-methyl-5α-androstane-3β,17β-diol-3-acetate.
2. 1,2β-methylene-5α-androstane-17β-ol-3-one-17-dichloroacetate.
3. 1,2β-methylene-17α-methyl-19-nor-5α-androstane-3β,17β-diol.
4. 1,2β-methylene-17α-methyl-19-nor-5α-androstane-17β-ol-3-one.
5. The process of making 1,2β-methylene-steroids which comprises subjecting, while disolved in an organic solvent, $\Delta^1$-unsaturated steroids to the action of methylene iodide in the presence of copper-plated zinc powder.
6. The compound having the formula

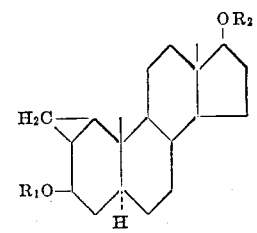

wherein R₁ is selected from the group consisting of hydrogen and acetyl and R₂ is selected from the group consisting of hydrogen, acetyl, propionyl, and enanthyl.

7. The compound having the formula

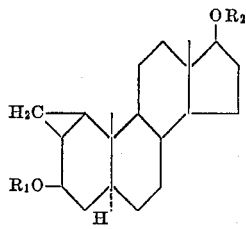

wherein R₁ is selected from the group consisting of hydrogen and acetyl and R₂ is selected from the group consisting of acetyl and propionyl.

8. The compound having the formula

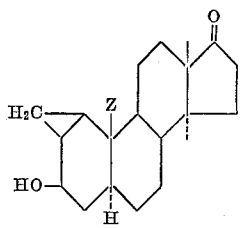

wherein Z is selected from the group consisting of hydrogen and methyl.

9. The compound having the formula

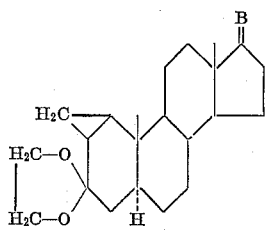

wherein B is selected from the group consisting of

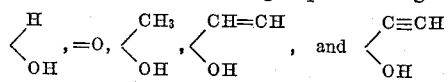

10. A compound selected from the group consisting of the 17-acetate, 3,17-diacetate, 17-propionate and 17-enanthate of 1,2β-methylene-5α-androstane-3β,17β-diol.

11. A compound selected from the group consisting of the 17-acetate, 17-propionate and 3-acetate-17-propionate of 1,2β-methylene-19-nor-5α-androstane-3β,17β-diol.

12. A compound selected from the group consisting of 1,2β-methylene-19-nor-5α-androstane-17β-ol-3-one and the 17-propionate and 17-acetate thereof.

13. A compound selected from the group consisting of 1,2β-methylene-17α-ethinyl-19-nor-5α-androstane-17-ol-3-one and 1,2β-methylene-17α-ethinyl-19-nor-5α-androstane-17β-ol-3-one-17-acetate.

14. A compound selected from the group consisting of 1,2β-methylene-17α-vinyl-5α-androstane-17β-ol-3-one and 1,2β-methylene-19-nor-5α-androstane-3β-ol-17-one.

15. A compound selected from the group consisting of 1,2β-methylene-5α-androstane-17β-ol-3-one-3-ethyleneketal 1,2β-methylene-5α-androstane-3,17-dione-3-ethyleneketal, 1,2β-methylene-17α-methyl-5α-androstane-17β-ol-3-one-3-ethyleneketal, 1,2β-methylene-17α-ethinyl-5α-androstane-17β-ol-3-one-3-ethyleneketal and 1,2β-methylene-17α-vinyl-5α-androstane-17β-ol-3-one-3-ethyleneketal.

16. The compound

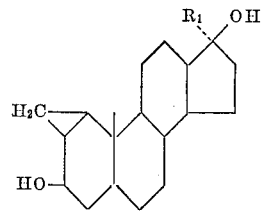

wherein R₁ is selected from the group consisting of methyl, ethyl and ethinyl.

17. The compound having the formula

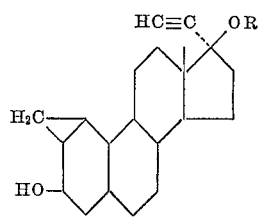

wherein R is selected from the group consisting of hydrogen and acetyl.

18. The compound having the formula

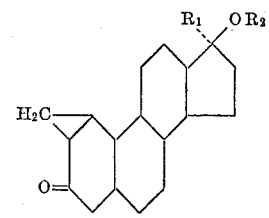

wherein R₁ is selected from the group consisting of methyl, ethyl, and ethinyl and R₂ is selected from the group consisting of hydrogen and acetyl.

References Cited

UNITED STATES PATENTS 3,127,396   3/1964   Wiechert et al. _____ 260—239.5

OTHER REFERENCES

Wiechert et al..: "Chem. Berichte," vol. 93 (1960), pages 1710–15.

ELBERT L. ROBERTS, Primary Examiner.

UNITED STATES PATENT OFFICE
CERTIFICATE OF CORRECTION

Patent No. 3,365,445                                January 23, 1968

Rudolf Wiechert et al.

It is certified that error appears in the above identified patent and that said Letters Patent are hereby corrected as shown below:

Column 13, lines 5 to 14, the formula should appear as shown below:

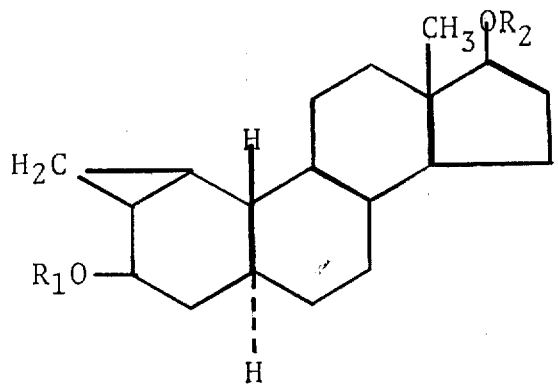

same column 13, lines 20 to 28, the right-hand portion of the formula should appear as shown below:

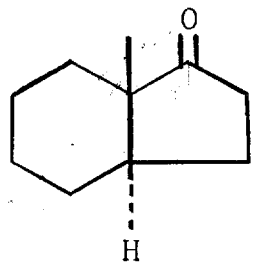

same column 13, lines 43 to 46, the portion of the formula reading

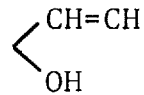        should read        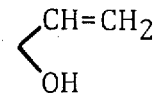

Column 14, lines 11 to 20, the right-hand portion of the formula should appear as shown below:

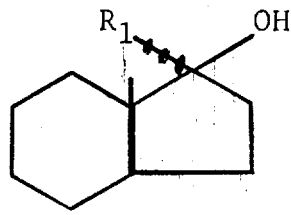

same column 14, lines 37 to 46, the formula should appear as shown below:

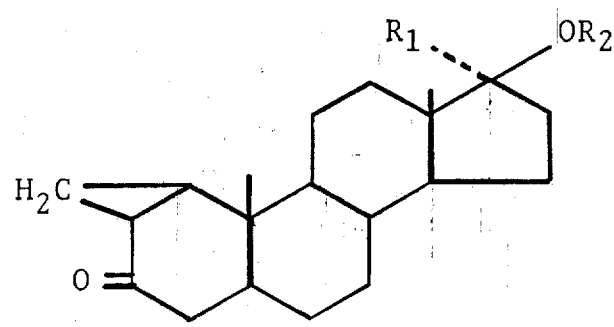

Signed and sealed this 3rd day of March 1970.

(SEAL)
Attest:

EDWARD M. FLETCHER, JR.
Attesting Officer

WILLIAM E. SCHUYLER, JR.
Commissioner of Patents